United States Patent [19]
Kotsuki et al.

[11] Patent Number: 6,020,974
[45] Date of Patent: Feb. 1, 2000

[54] COMMUNICATING APPARATUS

[75] Inventors: Kunio Kotsuki; Tokio Imahayashi; Masahiro Ezato, all of Fukuoka, Japan

[73] Assignee: Matsushita Electric Industrial Co., Ltd., Japan

[21] Appl. No.: 09/089,162

[22] Filed: Jun. 2, 1998

[30] Foreign Application Priority Data

Jun. 5, 1997 [JP] Japan ..................... 9-147504
Jun. 9, 1997 [JP] Japan ..................... 9-150600

[51] Int. Cl.$^7$ ........................................ H04N 1/00
[52] U.S. Cl. .................. 358/1.15; 358/400; 358/468; 379/93.09
[58] Field of Search ...................... 358/403, 400, 358/434, 435, 436, 438, 440, 442, 468; 395/114; 379/93.09, 93.14, 100.01, 100.14, 100.17, 102.02

[56] References Cited

U.S. PATENT DOCUMENTS

| | | | |
|---|---|---|---|
| 5,041,915 | 8/1991 | Hirota | 358/400 |
| 5,263,080 | 11/1993 | Jones et al. | 379/88 |
| 5,289,530 | 2/1994 | Reese | 358/88 |
| 5,301,246 | 4/1994 | Archibald | 380/23 |
| 5,396,486 | 3/1995 | Scott | 370/31 |
| 5,600,712 | 2/1997 | Hanson et al. | 379/142 |
| 5,907,605 | 5/1999 | Ramirez et al. | 379/142 |

FOREIGN PATENT DOCUMENTS

| | | | |
|---|---|---|---|
| 62-281661 | 12/1987 | Japan | H04N 1/32 |
| 09139792A | 5/1997 | Japan | H04N 1/00 |
| 9-139792 | 5/1997 | Japan | H04N 1/00 |

*Primary Examiner*—Jerome Grant, II
*Attorney, Agent, or Firm*—Venable; Robert J. Frank; Robert Kinberg

[57] ABSTRACT

In a communicating apparatus, telephone or directory application software can be automatically initiated in a personal computer. An off-hook detecting unit of the apparatus continuously makes a check to determine whether or not an external telephone is set to an off-hook state. If this is the case, the off-hook detecting unit sends off-hook information via a serial interface to the computer. An application initiation request unit of the computer monitors the serial interface. Having recognized an off-hook state of telephone in accordance with the off-hook information, the request unit automatically initiates the directory application software.

6 Claims, 6 Drawing Sheets

COMMUNICATING APPARATUS

BACKGROUND OF THE INVENTION

The present invention relates to a communicating apparatus for a telephone speech conducted via an external telephone connected to a personal computer.

It is possible today to achieve a telephone call from a personal computer (PC) in which an application software of telephone functions is installed. Moreover, image data can also be directly transmitted from a personal computer in which an application software of facsimile communications is loaded.

Most application programs of this type include a telephone directory function. Namely, in a case a telephone and facsimile numbers of a communication partner are beforehand registered to the directory of the application software, it is possible to automatically transmit the telephone or facsimile number to the partner only by indicating the partner in the directory list. Additionally, also when an external telephone is linked with the computer, the user desires to conduct a telephone call via the telephone book in many cases. After the directory is opened and the telephone call is established through a dialing operation, the call is carried out via the external telephone. Therefore, other operations can be accomplished by the computer.

Moreover, when a facsimile transmission is achieved to send a manuscript, it will be more efficient depending on cases that the telephone directory is opened only to dial the call number of the partner and the contents of the manuscript are actually read and transmitted by an external facsimile device.

However, in the conventional method above, when conducting a call, the user is required to make a search for the telephone directory application in the computer and to initiate the application. When it is desired to immediately make a telephone call, the operation is troublesome and annoyance for the user. In some computer applications, when using the external telephone, the user is required to set the external telephone to an off-hook state so as to set the computer to an on-hook state. This leads to a drawback that the operation is bothersome and the telephone set can be used only by those who are versed in the operation technique.

SUMMARY OF THE INVENTION

It is therefore an object of the present invention, which has been devised to remove the problem above, to provide a communication apparatus for use with external communication terminals such as external telephones and facsimile facilities in which the user can immediately conduct a visual check of the telephone directory without conducting the troublesome initiating operation.

To achieve the object above in accordance with the present invention, there is provided a communicating apparatus comprising an interface unit for establishing connection to a personal computer, an off-hook detecting unit for detecting an event that a telephone line is set to an off-hook state at initiation of communication, and a control unit for transmitting information of the detection from the off-hook detecting unit to a directory application initiation request unit integrally included in the personal computer. Thanks to this configuration, the troublesome operation and knowledge conventionally required for the telephone call from an external telephone using a personal computer become unnecessary. Namely, with the provision of this communicating apparatus, the telephone call can be easily achieved without any particular knowledge.

In accordance with another aspect of the present invention, there is provided a communicating apparatus comprising an off-hook detecting unit for detecting an event that the telephone line is set to an off-hook state at initiation of communication and outputting therefrom information of the detection, a bell signal detecting unit for detecting a bell signal received from the telephone line and outputting therefrom information of the detection, a caller information detecting unit for detecting a caller telephone number notified to a call receiver by a caller telephone number notification service, and interface unit for controlling a serial communication with a personal computer. The central control unit transmits information of the detection from the off-hook detecting unit and the bell signal detecting unit to a directory application initiation request unit incorporated in the personal computer and information of a partner detected by the caller information detecting unit to the personal computer.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
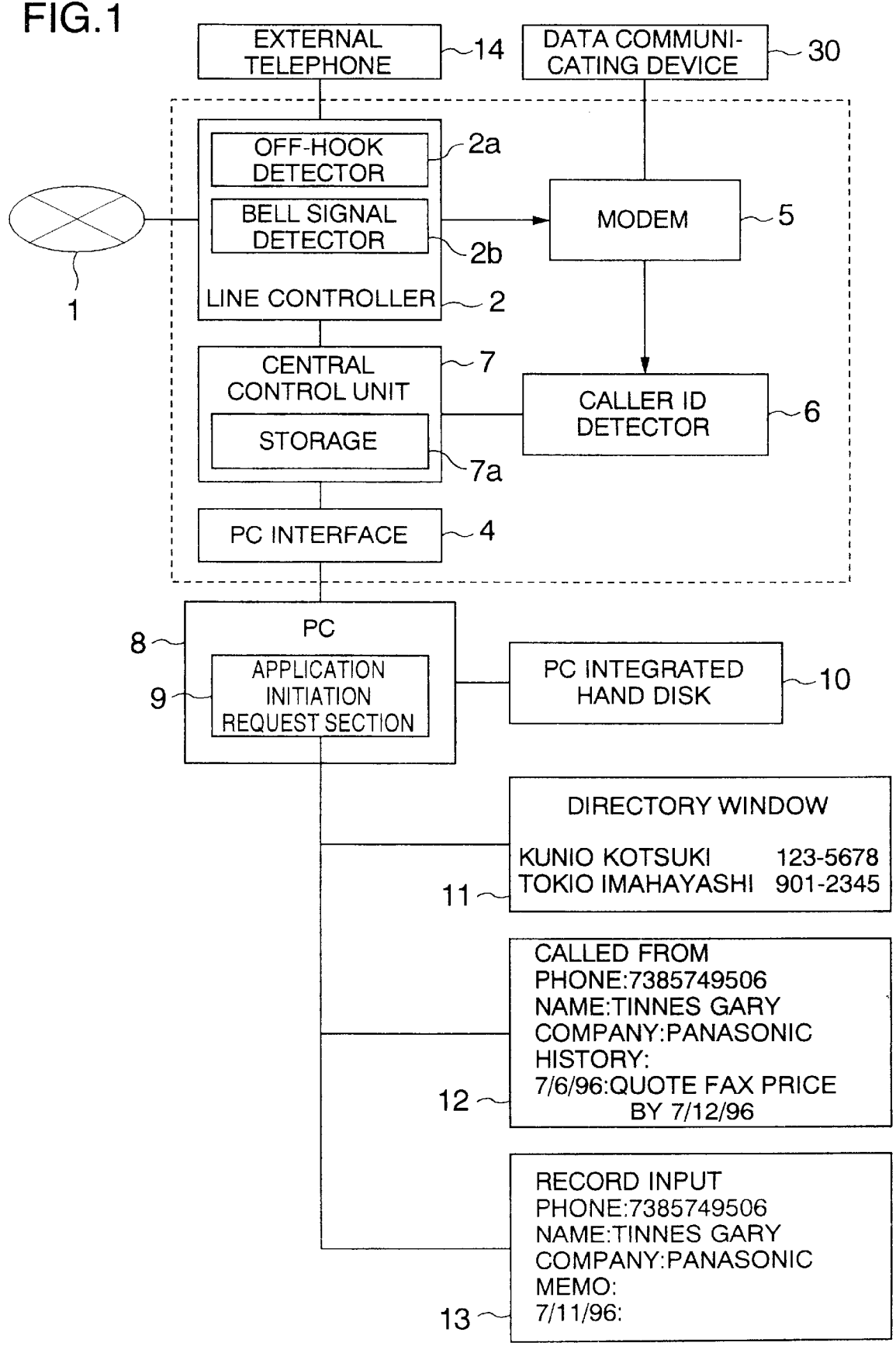
FIG. 1 is a diagram schematically showing a configuration of an embodiment of the communicating apparatus in accordance with the present invention.

Referring now to the drawings, description will be given of an embodiment in accordance with the present invention.

Figure 2:
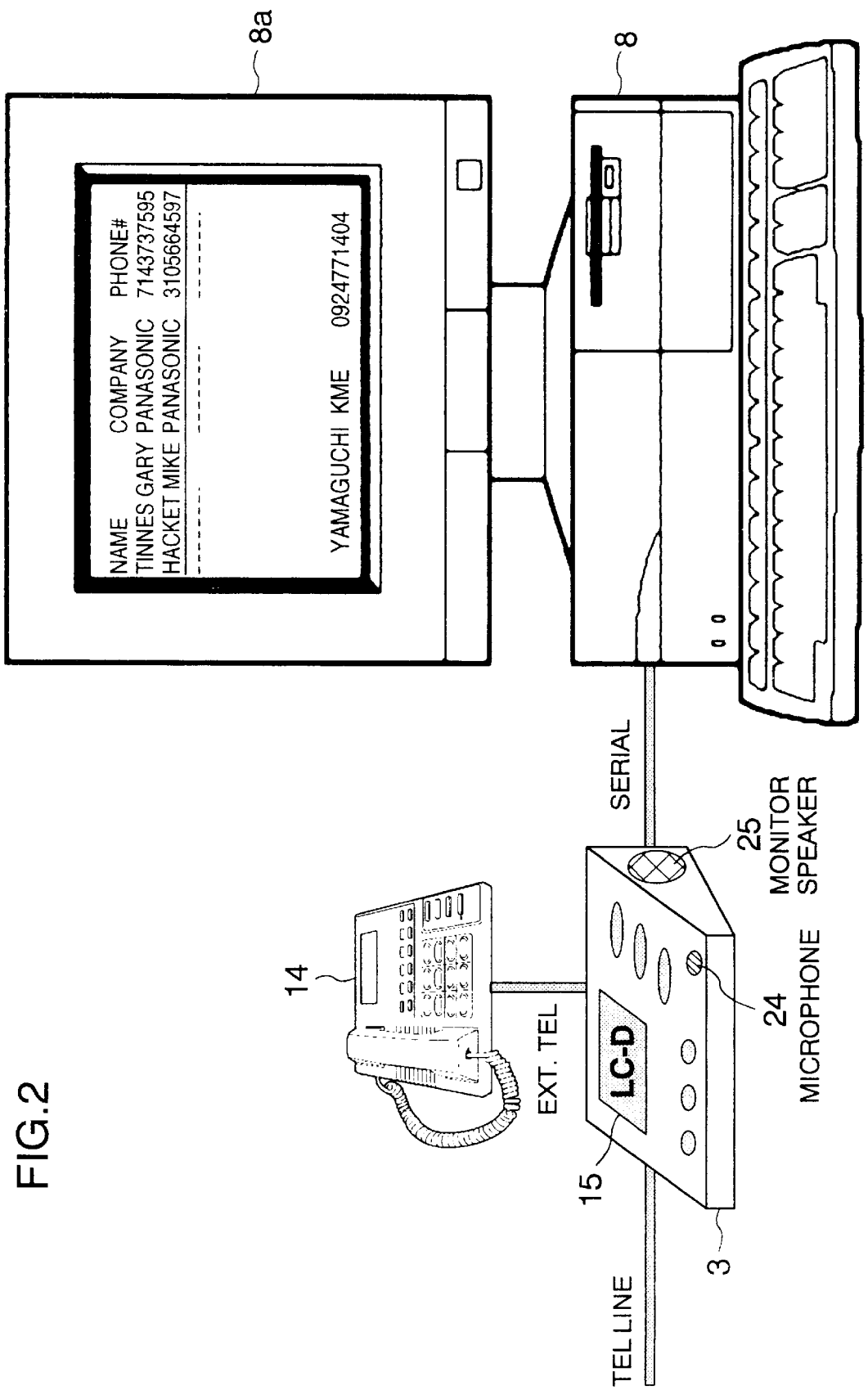
FIG. 2 is a perspective view showing an appearance of the communicating apparatus connected to a personal computer.
Figure 3:
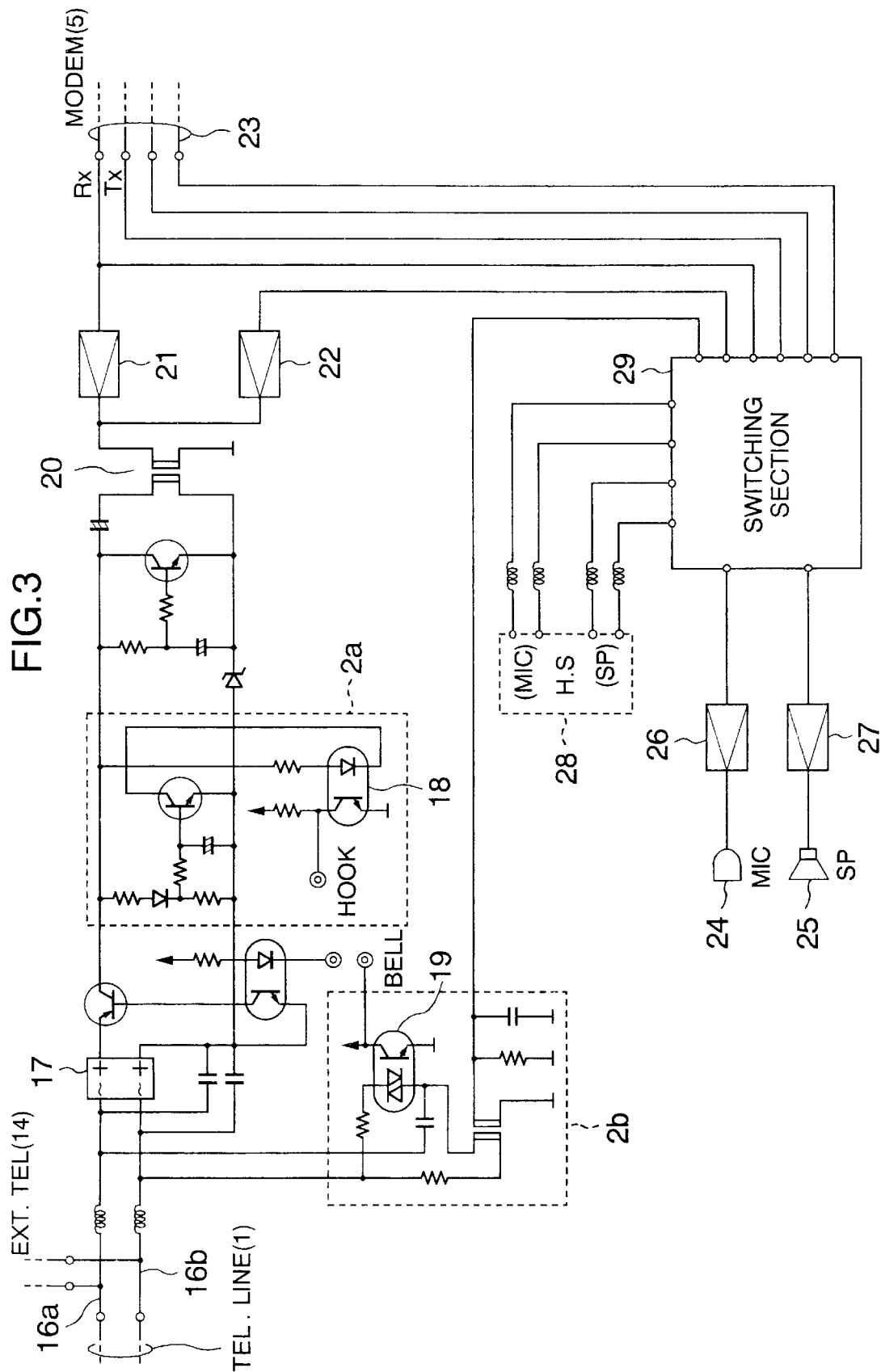
FIG. 3 is a diagram showing constitution of a line control unit of the communicating apparatus.
Figure 4:
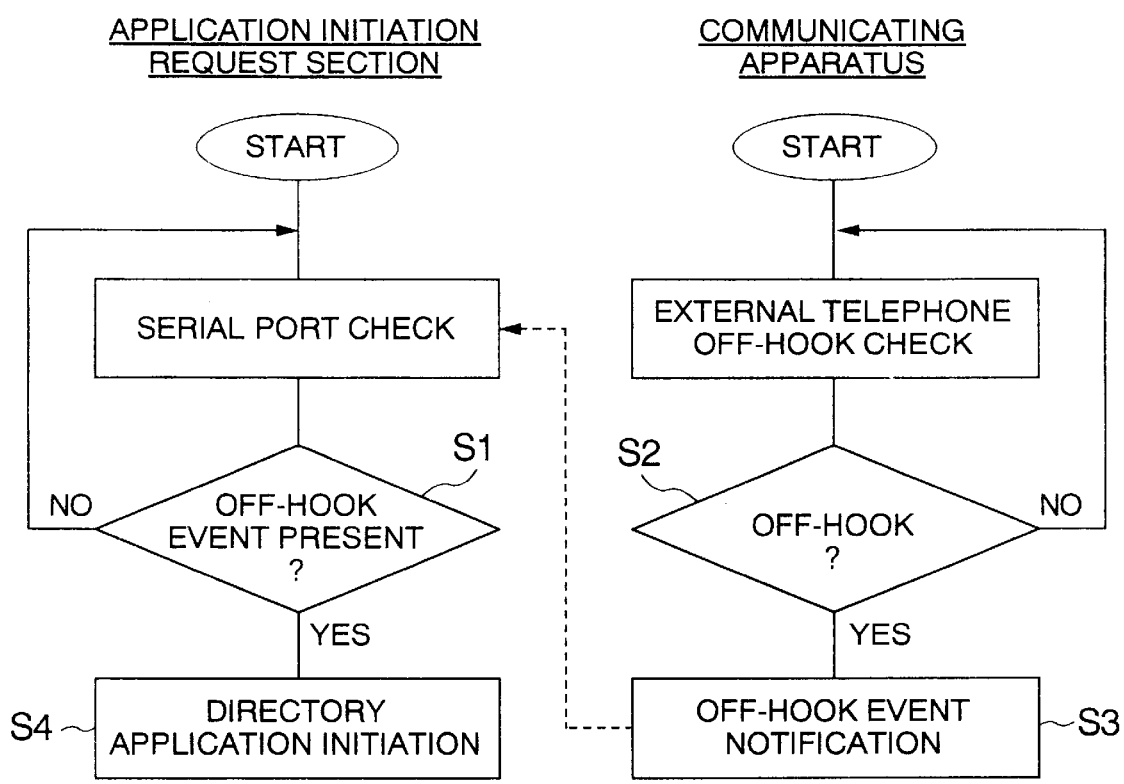
FIG. 4 is a flowchart showing a control procedure of a call issuing or originating operation in the embodiment.
Figure 5:
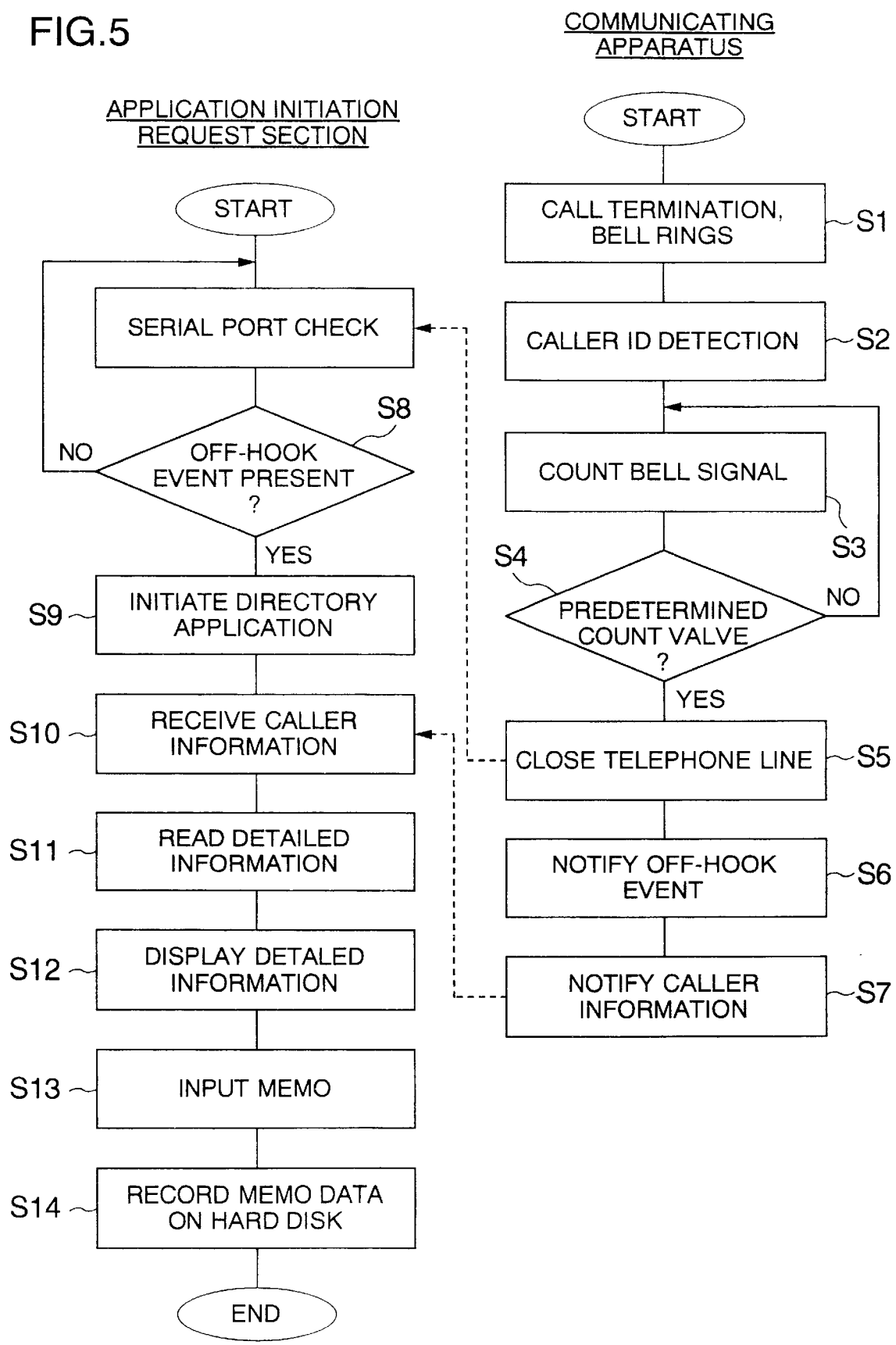
FIG. 5 is a flowchart showing a control procedure of a call terminating operation in the embodiment.

FIG. 1 shows in a block diagram the configuration of an embodiment of the communicating apparatus including an off-hook information detector and a call originator information detector in accordance with the present invention, FIG. 2 shows an appearance of the apparatus operated in connection with a personal computer, FIG. 3 shows in a circuit diagram the structure of a line controller of the communicating apparatus, and FIGS. 4 and 5 are flowcharts showing operation of the apparatus.

The constitution of FIG. 1 includes a communication network 1 through which the communicating apparatus of the embodiment communicates with other terminals and a line controller 2 to conduct functions such as a function to establish interface for the network 1. The controller 2 includes an off-hook detecting unit 2a to detect at initiation of a communication that the telephone line is set to the off-hook state and a bell signal detecting unit 2b to detect a bell signal received via the network 1. The controller 2 further achieves various functions such as an impedance matching function with respect to the network 1, a signal amplifying function, and a two-wire to four-wire converting or transforming function.

Moreover, the embodiment includes a personal computer (PC) interface 4 for the connection with a personal computer 8 and a modem 5 to connect thereto an external data communicating device 30, or an external facsimile apparatus, or the like for data communication.

The system further includes a caller identifier (ID) detecting unit 6 to detect a caller's telephone number notified to the receiver through an originating telephone number notification service. Specifically, the unit 6 extracts telephone number information from signals demodulated by the modem 5. There is also included a central control unit 7 to control the off-hook detector 2a, the modem 5, the caller ID detector 6, and the PC interface 4 linked with personal computer 8. The central control unit 7 supervises these units in accordance with a procedure shown in the flowcharts of FIGS. 4 and 5 to resultantly transmit off-hook information and caller information to the computer 8. The central control unit 7 includes a storage 7a.

The line controller 2 will be described by referring to FIG. 3. In the diagram, 16a, 16b, and 17 respectively indicate a chip wire, a ring wire, and a rectifier. A photo-interrupter 18 is disposed in the off-hook detector 2a. When an external telephone or the like is set to an off-hook state to lower a voltage between the chip wire 16a and the ring wire 16b of the telephone line, off-hook information is outputted to the output the terminal hook of the photo-interrupter 18 to be sent to the central control unit 7. A photo-interrupter 19 is also arranged in the bell signal detector 2b. When a bell signal is received from the network 1, a pulse wave is outputted to the output terminal bell to be delivered to the central control unit 7. A transformer 20 interrupts a direct current and to conduct a two-wire/four-wire conversion. A receiver amplifier 21 is installed in a receiver-side signal path, and a sender amplifier 22 is disposed in a sender-side signal path.

A microphone 24 and a loudspeaker 25 allow a user to conduct telephone speech without using hands. An amplifier 26 amplifies a signal outputted from the microphone 24 and an amplifier 27 causes the speaker 25 to sound. A jack 28 connects a handset to the system and a switching unit 29 establishes and changes connections of signal paths between the receiving and transmitting sides.

As can be seen from FIG. 2, the communicating apparatus 3 of the embodiment is coupled with the personal computer 8 in which telephone directory application software is loaded. The PC interface of the apparatus 3 is linked with a serial interface of the computer and hence the apparatus 3 can communicate information with the computer 3 in a serial communication. A liquid-crystal display 15 is arranged in the apparatus 3 and a display 8a is integrally disposed in the computer 8.

In FIG. 1, an application (APL) initiation request unit 9 operates in the computer 8. The unit 9 continuously monitors an event from the off-hook detector 2a of the apparatus 3 in accordance with the present invention.

The computer 8 includes a hard disk device 10. Information stored in the device 10 can be displayed on the display 8a. FIG. 1 also shows a display example 11 of a directory window of the directory window application software initiated by the request unit 9, a display example 12 of caller information by the software at call termination, and a display example 13 in which the user inputs a memo during a speech.

An external telephone set 14 allows the user to conduct speech by phone. The telephone set 14 is connected to the chip and ring wires 16a and 16b in a parallel fashion. When the telephone 14 is set to an off-hook state, the voltage between the chip and ring wires 16a and 16b is reduced.

Referring next to the flowcharts of FIGS. 4 and 5, description will be given of the operation of the communicating apparatus constructed as above in accordance with the present invention.

First, referring to FIG. 4, description will be given of an operation to originate call. The application initiation request unit 9 appropriately monitors the serial interface of the computer 8 to receive an off-hook event from the off-hook detector 2a (step S1).

At the same time, the detector 2a continuously makes a check to determine whether or not the external telephone 14 is set to an off-hook state (step S2). When the telephone 14 is set to an off-hook state, there flows a current between two wires 16a and 16b of the telephone line and hence the voltage therebetween is decreased. The detector 2a detects the voltage drop (step S2) to transmit off-hook information via the serial interface to the computer 8 (step S3).

Having recognized the off-hook state of the telephone 14 in accordance with the off-hook information, the application initiation request unit 9 of the computer 8 initiates the telephone directory application software (step S4).

With provision of the unit 9 and the detector 2a above, when the user carries out a speech through an external telephone by use of a personal computer, the troublesome operation to detect the telephone application software and/or the telephone directory application becomes unnecessary software. It is not required for the user to be versed in the telephone application software connected to the personal computer. Additionally, after the directory is opened and the partner's call number is dialed, the speech is accomplished by the external telephone. Consequently, the personal computer is not solely dedicated to be used for speech, namely, it is possible to achieve another operation by the computer.

Referring now to FIG. 5, description will be given of the operation of the apparatus at call termination. When a bell signal is received from the network 1, the external telephone 14 rings (step S1). At the same time, the caller ID detector 6 detects under control of the line controller 2 information of a partner (caller information) having issued the telephone call and then notifies the information to the central control unit 7 (step S2). The central control unit 7 at once stores the caller information in the storage 7a.

The number of bell signals from the network 1 is counted (step S3) to determine whether or not the count value is equal to a predetermined value (step S4). If this is the case, the line controller 2 automatically closes the telephone line (step S5) and then a current flows between two wires of the telephone line to lower the voltage therebetween.

Having detected the voltage drop, the off-hook detector 2a sends off-hook information via the serial interface to the computer 8 (step S6).

Moreover, the information including the partner's telephone number and the like which has been notified from the network 1 and which has been stored in the storage 7a as described above is also sent via the PC interface 4 to the computer 8 (step S7).

The application initiation request unit 9 continuously monitors the serial interface of the computer 8 to receive an off-hook event from the off-hook detector 2a. On receiving the event (step S8), the unit 9 of the computer 8 invokes the directory application software in accordance with the off-hook information (step S9).

Having received the caller information via the PC interface 4 of the apparatus (step S10), the software of the computer 8 accesses a database stored in the hard disk device 10 to read therefrom detailed information related to the received caller information (step S11) and then displays the detailed information on the display 8a as shown in the display example 12 of FIG. 1 (step S12). It is therefore possible to obtain partner's information in the past.

As described above, in accordance with the communicating apparatus of the embodiment, the application software of the personal computer can be initiated in association with the closing of the telephone line. Consequently, detailed information of the partner can be read from the storage of the computer 8 to be displayed on the screen, namely, it is possible to confirm the partner's detailed information before the telephone speech is started.

Subsequently, description will be given of a function to input memos in the system. Detailed information of a partner as a call originator can be inputted from a memo input screen to the system during or after a speech. When the external telephone 14 is set to the off-hook state or the memory input screen is activated in the directory application software, the processing of FIG. 5 is executed and then the memo input screen is displayed as the display example 13 of FIG. 1. In this situation, the user can input a record of the speech with the call originating partner to the system (step S13).

For example, when the user inputs the contents of speech to the system and terminates the computer application software, a record of the contents thus inputted is stored in the hard disk device 10 corresponding to caller information of the partner (step S14). Thanks to the provision, when a call is received from the same partner, the contents previously recorded can be displayed on the screen.

Figure 6:
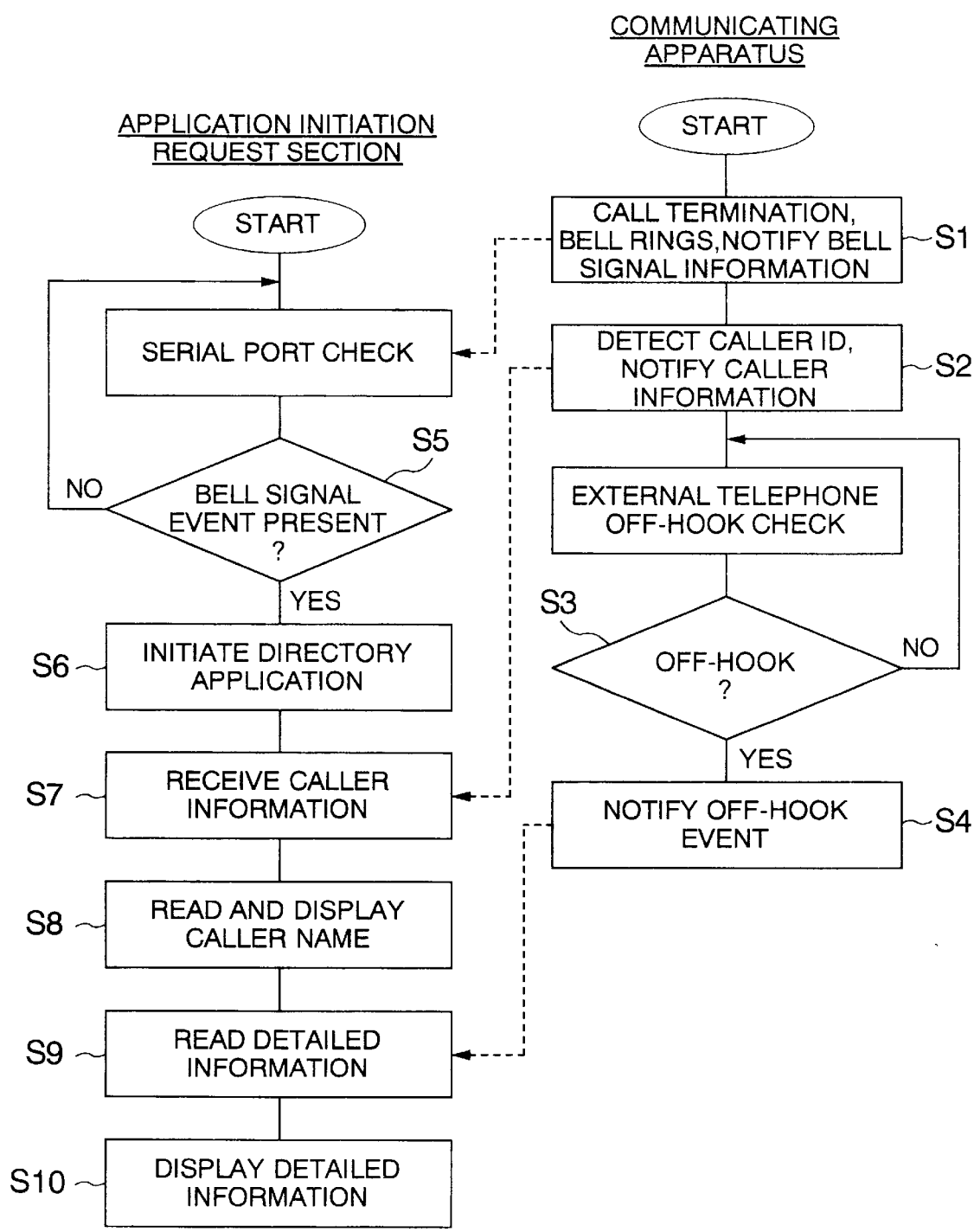
FIG. 6 is a flowchart showing a control procedure of a call terminating operation in another embodiment of the present invention.

Referring next to FIG. 6, description will be given of an alternative embodiment of the communicating apparatus in accordance with the present invention. This embodiment differs in the operating procedure from the preceding embodiment. In FIG. 6, when a bell signal in received via the network 1, the external telephone 14 rings. On this occasion, the bell signal detector 2b detects the reception of the bell signal to send information of the signal detection to the central control unit 7. As a result, bell signal detection information is passed from the central control unit 7 via the serial interface to the computer 8 (step S1). Simultaneously, under supervision of the line controller 2, the caller ID detector 6 senses information of the originating partner, i.e., caller information to notify the information to the central control unit 7. The central control unit 7 immediately transmits the caller information via the serial interface to the computer 8 (step S2).

In the computer 8, the application initiation request unit 9 continuously monitors the serial interface thereof to detect a bell signal event sent thereto. When such an event is received (step S5), the unit 9 immediately activates the directory application software (step S6). On receiving thereafter caller information from the communicating apparatus (step S7), the computer 8 accesses by the software the database stored in the hard disk device 10 to obtain a caller name corresponding to the notified caller information and then displays the name on the screen (step S8).

Recognizing the ringing of the telephone 14, the user raises the handset of the telephone 14 to set the off-hook state. This causes a current to flow between two wires of the telephone line to lower the voltage therebetween. The off-hook detector 2a then detects the voltage drop (step S3) and sends off-hook information via the serial interface to the computer 8 (step S4).

Having received the off-hook information, the computer 8 reads by the software the database in the disk device 10 to attain detailed information associated with the caller information (step S9) and then presents the detailed information on the display 8a as shown in the display example 12 of FIG. 1 (step 10).

In accordance with the communication apparatus of this embodiment described above, immediately after the reception of the bell signal the directory application software is initiated in the computer 8 before the user raises the handset of the telephone 14. Consequently, the user can visually check the caller information as early as possible. In addition, when the caller information transmitted together with the bell signal is detected, only the caller name corresponding to the caller information is read by the directory application software to be presented on the display. This advantageously reduces the period of time to access the objective item. The user can recognize the caller name during quite a short period of time after the telephone bell starts ringing to thereby recognize whether or not the handset is to be raised.

In the example above, the telephone speech is accomplished by an external telephone. However, the communicating apparatus of the present invention may be a facility including a function of voice speech, i.e., a voice amplifying function, a handset, and the like. In operation of any communicating apparatus integrally including the voice speech function, the directory application software can be initiated in the personal computer only by raising the handset thereof. Only by specifying a call terminating partner in a directory list, a telephone number of the partner can be automatically transmitted therefrom, which advantageously simplify the telephone operation.

Furthermore, the communicating apparatus in accordance with the present invention may include, for example, an image reading device for facsimile communication. After the contents of a manuscript are read by the image reader, the user can initiate the directory application software in the computer by a simple operation to close the line, i.e., by depressing an off-hook or monitor button. The user then need only specify a call terminating partner in a directory list to automatically send a telephone number of the partner therefrom.

As above, in accordance with the present invention, there is provided a communicating apparatus in which when the user to easily carry out a telephone speech with an external telephone of a personal computer, the troublesome operation and knowledge required to make a search for a telephone or telephone directory application software of the computer become unnecessary, which advantageously facilitates the telephone operation.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A communicating apparatus, comprising:
   line control means connected to a telephone line for conducting a line control operation including a dialing operation;
   bell signal detection means for detecting a bell signal to produce a detection information when the bell signal is received from the telephone line;
   caller information detecting means for detecting a caller telephone number notified to a call receiver by a caller telephone number notification service;

interface means for controlling a serial communication with a personal computer; and central control means for transmitting through the interface 1) the bell signal detection information for activating a telephone computer directory software in the personal computer, and 2) immediately after a time when the bell signal is received, transmitting the caller telephone number which is detected by said caller information detecting means for causing the telephone computer directory application software to access and display information stored in the computer that is associated with the caller telephone number.

2. A communicating apparatus according to claim 1, further comprising:

a handset having a function for voice speech or a voice amplifying function;

means for closing the telephone line in accordance with a state of the handset; and off-hook detecting means for detecting an event that the telephone line is closed at initiation of communication;

said central control means transmitting information of the detection from the off-hook detecting means to a directory application initiation request means integrally included in the personal computer for activating the telephone computer directory software in the personal computer when a call is originated from the communication apparatus.

3. A communicating apparatus according to claim 1, further comprising:

image reading means for facsimile communication;

operation means for a user to close a line before initiating the facsimile communication; and off-hook detecting means for detecting an event that the telephone line is closed at initiation of communication;

said control means transmitting information of the detection from the off-hook detecting means to a directory application initiation request means integrally included in the personal computer for activating the telephone computer directory software in the personal computer when the line is closed before initiating the facsimile communication.

4. A communicating apparatus according to claim 1, further comprising:

off-hook detecting means for detecting an event that the telephone line is closed at initiation of communication;

wherein the central control means for transmitting through the interface means transmits:

a) information of the detection from the off-hook detecting means to a directory application initiation request means incorporated in the personal computer for activating the telephone computer directory software in the personal computer when a call is originated from the communicating apparatus, and b) information of the detection from the off-hook detecting means subsequent to detection of the bell signal for causing the telephone computer directory software to display further information stored in the computer that is associated with the caller telephone number.

5. A communicating apparatus according to claim 1, further comprising:

off-hook detecting means for detecting an event that the telephone line is closed at initiation of communication and outputting off-hook detection information;

a personal computer in which directory application software is loaded; and application software initiation request means for initiating the directory application software in the personal computer in response to the off-hook detection information when a call is originated from the communicating apparatus and in response to the bell signal detection information when a call is received by the communicating apparatus.

6. A communicating apparatus, according to claim 1, further comprising:

a modem connected to an external data communication device for conducting data communication;

a transformer for interrupting a direct current and for achieving a two-wire to four-wire transforming operation;

a receiver-side amplifier installed in a signal path on a receiver side;

a caller-side amplifier installed in a signal path on a caller side;

off-hook detecting means including a photo-interrupter for producing detection information in accordance with a voltage between a chip wire and a ring wire;

bell signal detecting means including a photo-interrupter for producing detection information at an output terminal end thereof when a bell signal is received via a telephone network;

a microphone and a speaker arranged for a speech without using hands;

an amplifier for amplifying a signal outputted from the microphone;

an amplifier for sounding the speaker; and switching means for establishing and changing connections between the receiver side and the caller side.

* * * * *